US009235935B2

(12) United States Patent
Fogarty

(10) Patent No.: US 9,235,935 B2
(45) Date of Patent: Jan. 12, 2016

(54) ELECTRONIC TOLL CHARGE PAYMENT SYSTEM AND METHOD

(76) Inventor: Kenneth Christopher Fogarty, Clontarf (IE)

( * ) Notice: Subject to any disclaimer, the term of this patent is extended or adjusted under 35 U.S.C. 154(b) by 340 days.

(21) Appl. No.: 13/497,642

(22) PCT Filed: Sep. 22, 2010

(86) PCT No.: PCT/EP2010/063997
§ 371 (c)(1), (2), (4) Date: Jun. 4, 2012

(87) PCT Pub. No.: WO2011/036187
PCT Pub. Date: Mar. 31, 2011

(65) Prior Publication Data

US 2012/0329433 A1 Dec. 27, 2012

Related U.S. Application Data

(60) Provisional application No. 61/332,903, filed on May 10, 2010.

(30) Foreign Application Priority Data

Sep. 22, 2009 (IE) .................................... 2009/0728
Feb. 3, 2010 (EP) .................................... 10152564

(51) Int. Cl.
*H04M 3/42* (2006.01)
*G07B 15/06* (2011.01)

(52) U.S. Cl.
CPC .................................... *G07B 15/063* (2013.01)

(58) Field of Classification Search
CPC ..................... H04L 29/08108; H04M 2207/18
USPC ....................................................... 455/414.1
See application file for complete search history.

(56) References Cited

U.S. PATENT DOCUMENTS 5,857,152 A 1/1999 Everett et al.
2003/0189498 A1 * 10/2003 Kakihara et al. .............. 340/928

(Continued)

FOREIGN PATENT DOCUMENTS

EP 1477936 A2 11/2004
EP 1583038 A1 10/2005

(Continued)

*Primary Examiner* — Lester Kincaid
*Assistant Examiner* — Andy Gu
(74) *Attorney, Agent, or Firm* — Nixon Peabody LLP; David S. Resnick; David F. Crosby

(57) ABSTRACT

The invention provides a method and system toll charge payment system using electronic messaging from at least one electronic communication device, for example a mobile telephone, said system comprising: a remote communication system adapted to communicate with the at least one electronic communication device; recording means for capturing vehicle identifier information for vehicles passing through a toll charge area and storing said identifier information on said remote communication system or another remote communication system; characterised by said at least one communication device is associated with a pre-existing telecommunication account belonging to a user; means for sending an electronic message, for example a SMS (text) message or WAP message or voice control message, from the electronic communication device by said user to the remote communication system wherein said electronic message comprises a vehicle registration identifier and/or toll identifier information; and said remote communication system comprises means for automatically matching said received electronic message with said captured vehicle identifier information and, if a match is made, a toll charge payment is debited from the user's pre-existing telecommunication account and credited to a toll operator account. The main advantage of the system is that the user does not have to pre-register account information in order to effect a toll charge payment and no retrofitting of vehicles with specific devices is required. The convenience of the solution ensures widespread acceptance by users of toll charge systems.

20 Claims, 4 Drawing Sheets

(56) References Cited

U.S. PATENT DOCUMENTS

| | | | | |
|---|---|---|---|---|
| 2004/0107165 | A1 * | 6/2004 | Blair et al. | 705/40 |
| 2005/0279831 | A1 * | 12/2005 | Robinson et al. | 235/384 |
| 2007/0203836 | A1 * | 8/2007 | Dodin | 705/44 |
| 2008/0119162 | A1 * | 5/2008 | Sivalingam et al. | 455/408 |
| 2008/0162348 | A1 * | 7/2008 | Lee et al. | 705/44 |
| 2008/0275819 | A1 | 11/2008 | Rifai et al. | |
| 2009/0146845 | A1 * | 6/2009 | Hedley | 340/936 |
| 2010/0106567 | A1 * | 4/2010 | McNew et al. | 705/13 |

FOREIGN PATENT DOCUMENTS

| | | | |
|---|---|---|---|
| EP | 1852832 | A2 | 11/2007 |
| EP | 1944736 | A1 | 7/2008 |

* cited by examiner

ELECTRONIC TOLL CHARGE PAYMENT SYSTEM AND METHOD

CROSS REFERENCE TO RELATED APPLICATIONS

This application is a 35 U.S.C. §371 National Phase Entry application of International Application No. PCT/EP2010/063997filed on Sep. 22, 2010, which designates the United States, and which claims any and all benefits as provided by law including the benefit of priority of Ireland Application No.2009/0728filed on Sep. 22, 2009, EP Application No. 10152564.0 Filed on Feb. 3, 2010 and U.S. Provisional Application No. 61/332,903 filed on May. 10, 2010, the entire contents of which are hereby incorporated by reference in their entirety.

FIELD OF THE INVENTION

The invention relates to an electronic toll charge payment system and method. In particular the invention relates to an electronic toll charge payment system and method for vehicles, such as cars, vans, trucks, buses and motorbikes.

BACKGROUND TO THE INVENTION

Tolls are charged by governments or private companies for many reasons: to raise revenue, to reduce traffic levels, or to pay for construction of, for example, a road system or bridge. The general principle is that to use a section of road, roads within a predetermined area or areas, bridge, or area of the road network, a toll charge is payable. The toll can be charged for in many different ways: for example on a time in increments from minutes to hours to daily basis, on a per-use basis, or on an amount of use basis.

Numerous systems have been made for the electronic payment of tolls whereby sensors interact remotely with devices carried by passing vehicles or persons and, for example, a pre-paid token or pre-paid card in the device is cancelled or partially cancelled as payment. These do not provide a positive feed-back inter-action with the facilities used. Misreading and defective products give rise to increased losses to the operators and users alike at times. The absence of any reliable form of confirmation that the toll has been discharged is problematic.

Mobile or Cellular phones are being used for making payments, whereby the customer opens an account, enrols/registers/purchases devices first to permit for the payment service and then every time a payment has to be made, the customer sends a text message consisting of a security code, the amount to be paid and other pertinent data to a special access number. For example, it is known to use RF ID technology for making road toll payments using SMS text messages. In road toll systems, the mobile phone or cell phone is simply waived "to be seen" on a Reader located on top of the gate. In toll ways, the customer drives through the toll plaza and as long as the mobile phone is located within the driver's area it will be automatically sensed by a Reader installed on the side of the toll booth. The RF ID chip with memory can either be in the form of a thin flat module which is attached to the back of the cell phone or embedded in the SIM card inside the mobile or cell phone.

The main problem with all automated toll charge payment systems requires users to set up an account or have their vehicle or phone retro fitted with a RF ID device to allow for automated payment of the toll. This is problematic as many people are not sufficiently technically minded to set up an account or simply are not aware as to how to set up an account. In addition to this the requirement of setting up accounts furnishing personal, financial and other details together with account maintenance costs is unacceptable. For example, European Patent Publication number EP 1 583 038 A1, assigned to C.R.F. Societa Consortile per Azioni, discloses an automatic toll pay system where an on-vehicle unit is installed in the vehicle which has a receiving function for receiving toll information when the vehicle passes through a toll area. The on-vehicle unit is adapted to co-operate with a mobile phone that provides a communication channel to allow the on-vehicle unit send/transmit toll payment information. There are two problems with this system, the first is that each vehicle is required to be retro-fitted with the on-vehicle unit and secondly each vehicle must be pre-registered with the toll operators that requires financial details of the vehicle user in order for a toll to be paid.

Another problem is for non-frequent users or tourists when passing through an automated toll charge system is very difficult to monitor and enforce. As a result, some people will forget to pay road tolls charge occasionally, or not realise that they have to pay a toll charge, and these people will end up with a fine. Alternatively, people who do not know how the system works, or that it exists, may not be aware that they have to pay it or how to pay it.

A further problem with remote toll charge payment systems is in maintaining the ability to pursue those who have not paid while preserving the principle of anonymity to adhere to privacy legislation in some countries. A growing resentment on the part of consumers being required to disclose personal, financial and other details to drive on the roads is also a factor.

A typical operating system provides a photographic or video camera recognition system may be positioned on or adjacent to a gantry to photograph the number plates of vehicles in a road toll charge system the passage is recorded and stored. Such photographs or more usually video/digital image recordings and are of no monetary value being discarded if the toll payment transaction were completed satisfactorily. Alternatively microwave or radio tag identification association with the vehicles or communication devices might be employed however these can also be the source of difficulty. False and misreading errors occur frequently with certain conditions, such as adverse weather, condition of vehicle registration plates and improperly sited cameras, inoperative tags or RF ID devices for example.

The existing method of enforcing payment is to arrange that the defaulter is traced through the registration details recorded by the license plate camera. This is compared with the central database of vehicle registration numbers for contact details attached or associated with the vehicles in default. It is this default group that is processed using the system of written notification and demand for payment on terms. These traditionally include the imposition of late payment charges, fines and legal proceedings in the event that the toll charge remains outstanding. This gives rise to significant increase in costs associated with the use of the toll charge facilities to the consumer and by reason of costs incurred, public relations fallout, to the toll charge operator. The restriction of methods of payment by toll charge operators is considered by solicitors or lawyers as being in breach of competition requirements and could give rise to a determination that it constitutes an unlawful imposition of a penalty, such a situation, requiring repayment in due course of millions of currency units to consumers affected.

In addition to this aspect of the operation, as exists at present, the false reading/error of tags in or on vehicles fitted with a RF ID device is the source of consumer dissatisfaction.

When this is challenged in the courts is likely to result in damages for breach of contract against the tag/toll operator. Because this is a foreseeable result, this gives rise to significant resources being invested in call centers and infrastructural facilities to deal with complaints arising. The costs to the toll charge operator in public relation terms is high, particularly when the consumer is of the view, rightly or wrongly, that they did nothing wrong. The existing default procedures result in the issuing of letters of demand and legal enforcement procedures.

There is therefore a need to provide a system and method to facilitate a simple mechanism for toll charge payment by customers or users of toll charge systems that overcome the above mentioned problems.

SUMMARY OF THE INVENTION

According to the invention there is provided, as set out in the appended claims, a toll charge payment system using electronic messaging from at least one electronic communication device, for example a mobile telephone, said system comprising:

- a remote communication system adapted to communicate with the at least one electronic communication device;
- recording means for capturing vehicle identifier information for vehicles passing through a toll charge area and storing said identifier information on said remote communication system or another remote communication system; characterised by:
- said at least one communication device is associated with a pre-existing telecommunication account belonging to a user;
- means for sending an electronic message, for example a SMS(text) message or WAP message or voice control message, from the electronic communication device by said user to the remote communication system wherein said electronic message comprises a vehicle registration identifier and/or toll identifier; and
- said remote communication system comprises means for matching said received electronic message with said captured vehicle identifier information and, if a match is made, a toll charge payment is debited from the user's pre-existing telecommunication account and credited to a toll operator account.

The main advantage of the system is that the user does not have to pre-register account information in order to effect a toll charge payment. In other words no pre-registration is required by a user and no retro-fitted device or unit is required for the vehicle. The system operates akin to a premium text service where a user's telephone phone account (pre-existing telecommunication account) is debited for the toll charge amount in response to text information, which allows for simple and easy useful mechanism to pay a toll charge fee. As far as paid transaction to all of these facilities is concerned, the use of the SMS (TEXT) payment solution is the most cost effective non-intrusive system maximising the use of existing technology and the public familiarity with it to provide a public service payment mechanism. The removal of account opening requirements and maintenance charges provides a fair solution which respects privacy of the road user. The solution is in the nature of a public service which has many advantages that will be readily apparent to users that pay tolls.

The proposed solution permits payment at a time and place convenient to the consumer and provided that the conditions required and described prevail the toll charge is recovered at reduced cost to for all parties involved.

The invention will virtually eliminate the existing default procedures in the issuing of letters of demand and legal enforcement procedures reducing significantly the costs of toll charge operations.

The electronic transaction can be recorded and stored in encrypted form and complies with the Data protection and Privacy Legislation while providing recoverable data enabling resolution of disputes between parties efficiently at minimal cost.

The vehicle users telephone account (pre-existing telecommunication account) once debited issues and carries an electronic receipt which is time coded record of a completed toll charge transactions payment in respect of a specific vehicle of a class and registration traveling in a specified direction on a specified Toll charge route. This provides an electronic receipt in readable form thereby reassuring the consumer that the payment has been made and is provable removing doubt.

In one embodiment the system is adapted to ensure that in the event that the system proposed has been used before to effect payment of a toll charge and a toll charge remains outstanding as against the vehicle in respect of which payment was last made by that electronic communication device, for example a fixed line or mobile telephone, if insufficient funds are available from said pre-existing telecommunication account, said remote communication system comprises means for sending an electronic message SMS(text)/WAP to said electronic communication device, for example a fixed line or mobile telephone, device advising the user of the inability to effect the toll charge payment by reason of insufficient funds. This service is free and available provided that the toll charge remains outstanding and a late charge is about to be imposed. The transaction immediately previous to the one in question had made payment using the solution system.

In one embodiment the system is adapted such that in the event that the vehicle registration details disclose that the associated toll charge remains un-discharged and the said vehicle had in the last past transaction used the system to pay the toll an SMS(TEXT)/WAP is generated by said remote communication system and sent to that electronic communication device, for example a fixed line or mobile telephone which last discharged that vehicle toll charge, advising that a toll remains unpaid and inviting to make payment using the system. Upon such advice being sent in the manner described, if a payment is to be made using the system. That requires the vehicle registration and toll code must be furnished in the usual manner thereby ensuring that the details required to effect the transaction and conditions attached are provided thereby protecting issues of privacy and data protection.

In one embodiment the remote communication system comprises a data storage facility and micro-payment facility adapted to facilitate toll charge payment from said pre-existing telecommunication account.

In one embodiment the electronic message comprises an SMS (TEXT) message containing data required comprises details necessary to effect the transaction being undertaken.

In one embodiment the toll charge payment amount is dependent on the class of vehicle and said electronic message comprises information identifying the class of vehicle which said class is as recorded in the central data bank of the vehicle registration records.

In one embodiment the electronic message comprises a toll code in the form of XY, where X is the toll identifier and Y the direction of travel when toll was incurred.

In one embodiment there is provided a electronic communication device, for example a fixed line or mobile telephone, system using an SMS/WAP system including personal SIM cards and the mobile and/or fixed line telephones identifier is the personal identifier in the SMS/WAP system. A SIM card can access pre-existing telecommunications account enables pre-pay and/or account pay mobile and/or fixed line telephones to carry out transactions with the system.

In one embodiment the data is required to be furnished can be sent by any communication device to effect a transaction for any vehicle and an electronic receipt issues to that device in the next future or immediately following transaction and will only give rise to a last receipt generated SMS (TEXT) if a toll charge remains due and owing following a toll charge being incurred.

In one embodiment the recording means comprises a camera associated with the toll location and captures images of the license plates of each vehicle that passes through the toll charge area and stores said license plate information with a time code stamp in said remote communication system.

In one embodiment the comparison reveals the solution system users with accounts capable of being debited to the class appropriate to the central vehicle registration data bank relating to that particular vehicle having used the solution system on the last transaction are advised free gratis prior to the imposition of late payment charges that such toll charges remain un-discharged and inviting payment using the solution system.

In one embodiment wherein the imposition of late payment charges that such toll charges remain un-discharged and inviting payment using a solution system requires the furnishing of the details relating to the payment being the vehicle registration, toll code, direction of travel and class of vehicle In one embodiment the toll charge area comprises a congestion charge area.

In one embodiment the toll charge area comprises a vehicle parking charge area.

In one embodiment the remote communication system comprises a voice recognition system adapted for translating said voice control message into a data message representative of the vehicle registration identifier.

In another embodiment of the present invention there is provided a method for toll charge payment using electronic messaging from at least one electronic communication device, for example a mobile telephone, said method comprising the steps of:

- adapting a remote communication system adapted to communicate with the at least one electronic communication device;
- recording vehicle identifier information for vehicles passing through a toll charge area and storing said identifier information on said remote communication system or another remote communication system; characterised by:
- associating at least one communication device with a pre-existing telecommunication account belonging to a user;
- sending an electronic message, for example a SMS(text) message or WAP message or voice control message, from the electronic communication device by said user to the remote communication system wherein said electronic message comprises a vehicle registration identifier and/or toll identifier information; and
- matching said received electronic message with said captured vehicle identifier information and, if a match is made, a toll charge payment is debited from the user's pre-existing telecommunication account and credited to a toll operator account.

In a further embodiment there is provided a toll charge payment system comprising using electronic messaging from at least one electronic communication device, for example a mobile telephone, said at least one communication device is associated with a pre-existing telecommunication account belonging to a user;

- means for sending an electronic message, for example a SMS(text) message or WAP message or voice control message, from the electronic communication device by said user to a remote communication system wherein said electronic message comprises a vehicle registration identifier and/or toll identifier information; and
- said remote communication system comprises means for automatically matching said received electronic message with recorded vehicle identifier information and, if a match is made, a toll charge payment is debited from the user's pre-existing telecommunication account and credited to a toll operator account.

In another embodiment there is provided a vehicle congestion charge payment system comprising using electronic messaging from at least one electronic communication device, for example a mobile telephone, said at least one communication device is associated with a pre-existing telecommunication account belonging to a user;

- means for sending an electronic message, for example a SMS(text) message or WAP message or voice control message, from the electronic communication device by said user to a remote communication system controlled by congestion charge operator wherein said electronic message comprises a vehicle registration identifier and/or congestion identifier information; and
- said remote communication system comprises means for automatically matching said received electronic message with recorded vehicle identifier information and, if a match is made, a congestion charge payment is debited from the user's pre-existing telecommunication account and credited to a congestion charge operator account.

In a further embodiment there is provided a vehicle parking charge payment system comprising using electronic messaging from at least one electronic communication device, for example a mobile telephone, said at least one communication device is associated with a pre-existing telecommunication account belonging to a user;

- means for sending an electronic message, for example a SMS(text) message or WAP message or voice control message, from the electronic communication device by said user to a remote communication system controlled by a vehicle parking operator wherein said electronic message comprises a vehicle registration identifier and/or parking meter location identifier information; and
- said remote communication system comprises means for automatically matching said received electronic message with recorded vehicle identifier information and, if a match is made, a parking meter charge payment is debited from the user's pre-existing telecommunication account and credited to a vehicle parking operator account.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
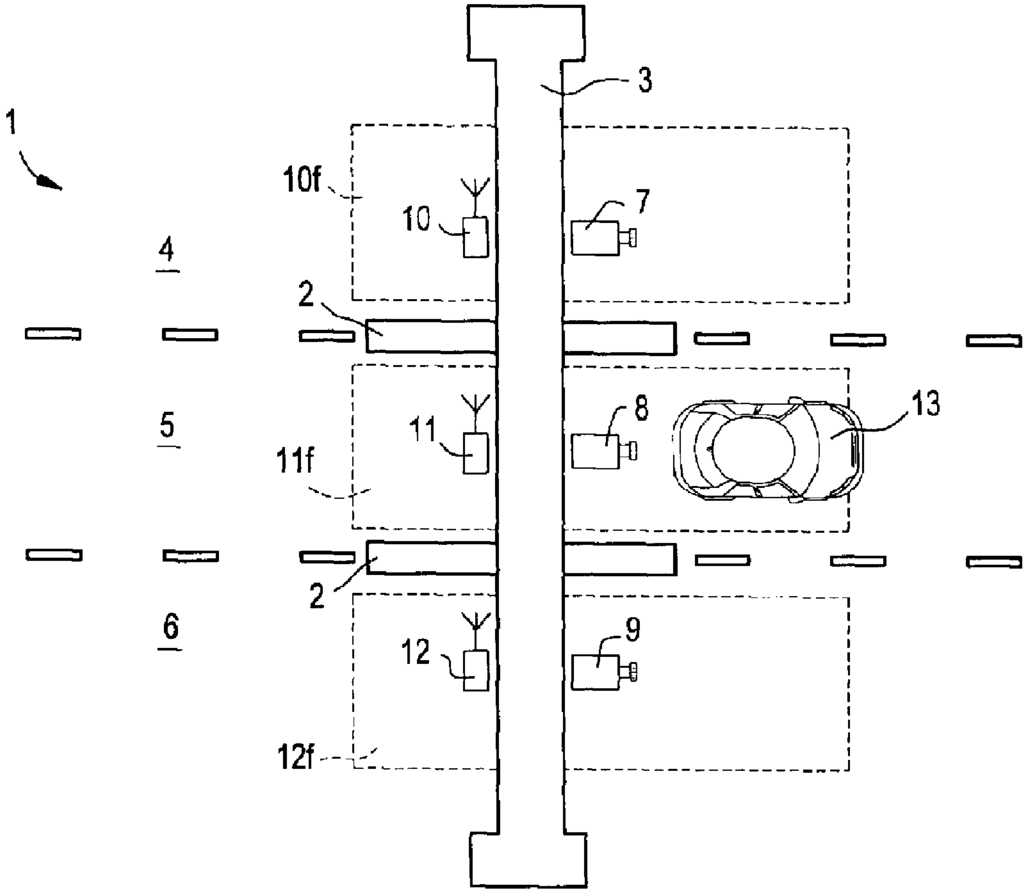
Figure 1 PRIOR ART
FIG. 1 illustrates a typical plan view of a vehicle toll charge collection system.

Referring to FIG. 1 there is shown a prior art toll charge system illustrating one three-lane express payment carriageway 1 of a road for which tolls charge are to be levied. Traffic islands 2 channel the lanes at a toll gantry 3. The three express lanes 4, 5, 6 are for non-stop electronic toll charge payment. It is to be understood that traffic without electronic payment facilities is diverted through conventional toll charge gates (not shown). Each of the three lanes 4, 5, 6 is observed by a respective video camera 7, 8, 9 which is triggered to photograph the each vehicle 13, and in particular the license plate details are captured and stored in a database. Each lane 4, 5, 6 also has a very short range radio transmitter/receiver 10, 11, 12 shielded from its neighbours by electromagnetic shielding to give a respective radio footprint ***10f*, *11f*, *12f* covering only its respective lane 4, 5, 6 so as to allow localised communication with a vehicle 13**.

Figure 2:
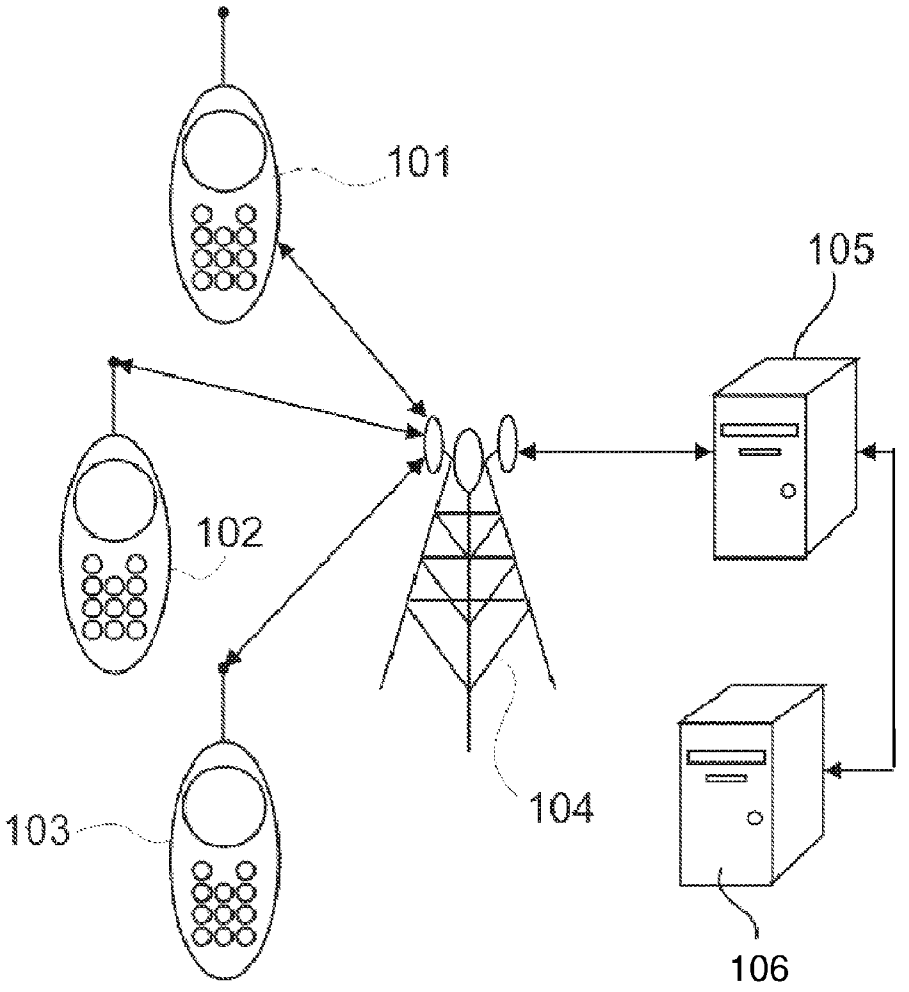
FIG. 2 illustrates a simple block diagram of the vehicle toll charge collection system according to the invention.

FIG. 2 illustrates an overview of the system according to the invention showing a plurality of electronic communication devices, 101, 102, 103 adapted to communicate with a remote communication system 105 via a base station 104. The communication devices are preferably mobile or cellular telephones. Each mobile phone 101, 102 and 103 is associated with a pre-existing telecommunication account belonging to separate users. In operation when a mobile phone user travels through a toll charge area in their vehicle the user sends a SMS(text) message or WAP message or voice control message, from the electronic communication device 101 to the remote communication system 105, which is controlled by the toll operator. The electronic message comprises a vehicle registration identifier and/or toll identifier information. The remote communication system 105 comprises means for automatically matching the received electronic message with captured vehicle identifier information (as described above) and, if a match is made, a toll charge payment is debited from the user's pre-existing telecommunication account and credited to a toll operator account. This can be easily achieved by the remote communication system 105 by having an arrangement with the mobile phones user telecommunication account stored on a server 106 which is separate to the toll operator remote communication system 105. The server 106 is controlled by a mobile phone operator. The mobile phone user account is debited with the requisite toll fee and credited to the toll operator without the need for the user to provide the toll operator with any personal financial details.

The invention provides a simple electronic toll charge payment solution using mobile and/or fixed line telephone so advising that a toll has been or will be incurred by a vehicle bearing numbers and letters on a toll coded facility referenced code (x x) heading in a particular compass direction (N<S<E<W>) and unless the vehicle is of a particular class for example a motor cycle or private motor vehicle or truck, the appropriate type/class of vehicle automatically debits the account of the sending device and having done so issues an electronic receipt with the data time coded. No pre-registration with the toll charge operator by the vehicle user is required.

In the event that the toll charge remains unpaid and the vehicle registration data indicates that the vehicle had paid on the last toll occasion using the system, an SMS (TEXT)/WAP is generated and sent to the last device that paid that vehicle toll, enquiring if they wish to discharge the toll charge using the system, and if so, requesting then the required data must be sent in the event that the system is required to discharge the toll charge. All of the details must be furnished in the usual manner, the operation of which is described in more detail below.

The system provides for increased general compliance by requiring the user to send details of the vehicle and charge journey to the service provider thus reducing the false reading of registration plates as comparison data is provided improving accuracy.

A micro-payment system of the telecoms provider is used without cost to the system. The default detection already in place by toll charge operator is used without cost to the system.

The record of the "transactions" is stored sent and retrieved from the existing SMS (text)/WAP service provider without cost to the system. The "best account" status for users of the service is secured by negations with toll charge operators and the cost kept to a minimum by reason of scale. The system is designed to make existing "bad" debit transactions into cost efficient more profitable toll charge collections. This provides a public relations last reasonable chance to pay the toll charge for those that want to pay.

Electronic cash is held in electronic purses being pre-paid or post-paid accounts with sufficient credit or credit facilities attached to the device in use to effect the transaction being undertaken. An electronic purse is a device used to indicate a value transfer system for cashless transactions involving a micro-payment system which already exists in the telecommunications aspect of the invention. Value is transferred electronically from one purse to another or from telecommunications to banks' or retailers' terminals. Transfer may be made by direct electronic connection between purses, by telephone connection using mobile and/or fixed line telephones using SMS(TEXT)/WAP.

All transactions are truly anonymous and security is ensured by a key encryption system. Individual messages in the system can be transmitted in less than >00.1 sec but there may typically be three or four messages interchanged in a transaction and encryption/decryption of each may take 500 m/sec. Therefore, a typical transaction may take up to ten seconds to complete. This is too long to allow swiftly moving traffic to effect a secure electronic cash transaction in passing a toll gantry and this gives rise to the "free ride" for close following vehicles while the leaders in the line are often billed as "tractor trailer" class.

According to the invention the system provides for toll charge payment by mobiles and/or fixed line telephones comprising an electronic purse or credit coupled to the device being used to effect the transaction. This is used as part of an electronic micro-payment system, for the toll charge payment systems which already comprising devices in place to process credit cards, cash and a remote communication system for communicating with in vehicle mobile communication devices to effect toll charge payments by tags/secure value transfer messages. The following is an example command structure of the solution in dealing with data in this case vehicular traffic of class II (private motor vehicle). In the event that other classes use the solution the additional information is added to the required data as follows:

| | |
|---|---|
| SMS (TEXT) to service provider of the following data; | e.g. 5text ™ |
| Vehicle registration letters and numbers, | 95d 31110, |
| Toll code and direction, Motorway 50 North | m50 (n). |
| Class III, Light Van, | III. |

Data discloses; service provider 5text, vehicle Reg 95d31110, traveling m50, north, class of . . . etc; however the data bank reveals that this vehicle is in fact . . . a grey merc-benz coupe being a class II vehicle. The system sends receipt 95d31110m50 (n) . . . {this will be charged class II}

Electronic receipt issues to the devices with: Time coded 95d31110m50n.

Default issues that arise are provided for in the solution and described above in detail.

Should it transpire that the incorrect registration was used and it was a Class III (light van) the phone account is in credit for a class II charge, but the toll charge remains unpaid for the light van until the correct details are provided and sent. This remains the consumers obligation throughout the process.

Figure 3:
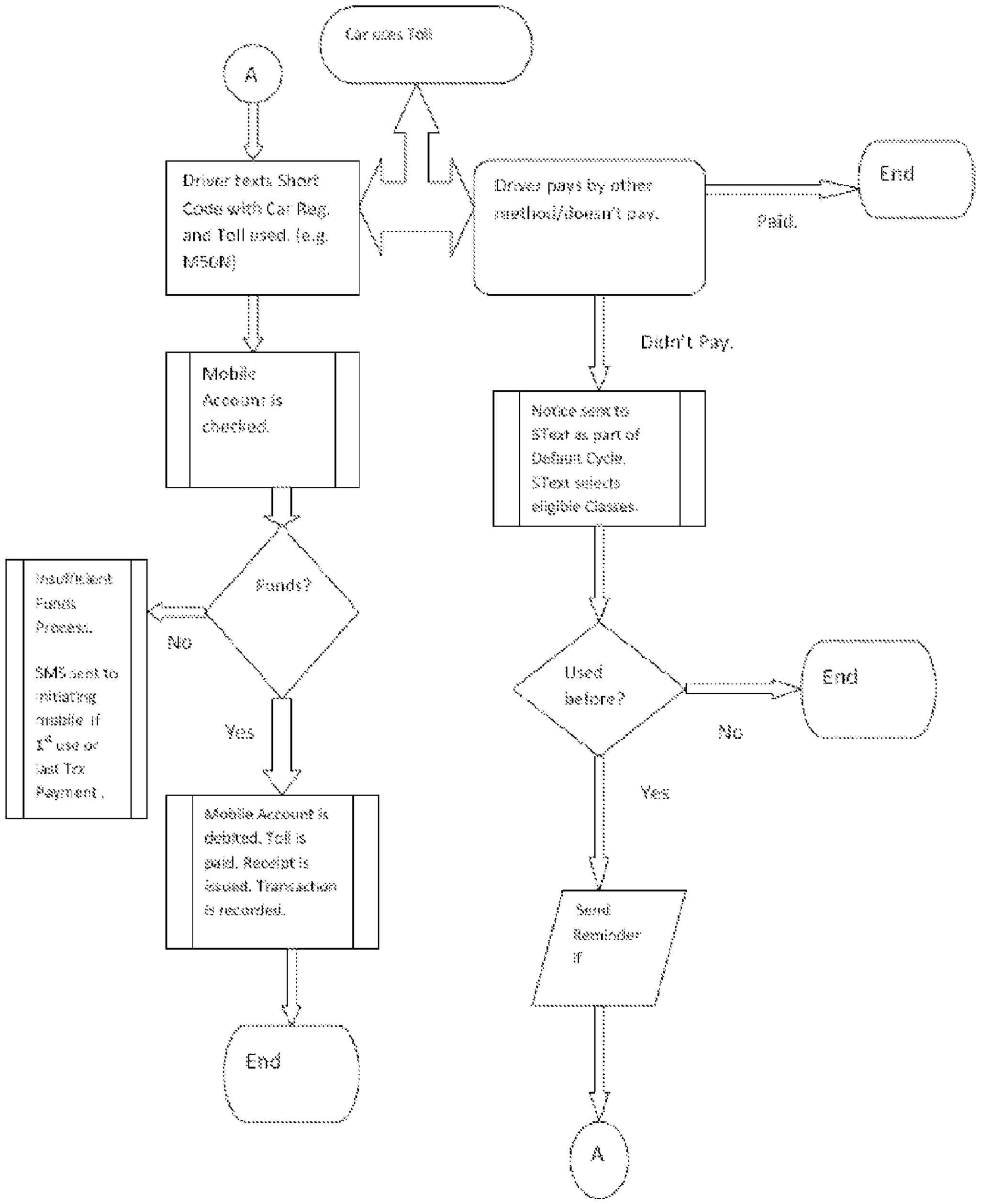
FIG. 3 is a flow chart of the communication logic flow and electronic checking solution of the toll charge payment system according to the invention.

Referring now to FIG. 3 illustrates the logic flow of the invention and the basis in software to the solution and the interface with the toll charge operator and the telecommunications provider being the micro-payment system and the SMS(TEXT)/WAP operator provider as data storage and electronic receipt issuer.

1. Vehicle, for example a car passes through a toll area or zone.
2. Driver does not pay Toll via SMS at this point or pays via some other method, no further processing.
   2.1. Potential for being processed later as at 16.
3. Driver sends Information via text message to payment system (Vehicle Registration and Toll code and #(Class) 1,2,3 used).
   3.1. By default, the mobile phone number is also sent.
4. The system checks database for this vehicle/phone number. If 'Barred' vehicle/phone number do nothing—go to 12.
5. The system confirms Toll charge for the provided vehicle Class at that Toll.
5.1. The system checks to see if there was a 'Reminder Process' or/and 'Insufficient Funds Process' SMS sent in order to correctly assess charge. If yes, include extra charge.
6. The system confirms funds (Toll+5text™ charge(s)) are available from the supplied mobile phone number account.
7. If funds are available from the account process is as at 8 below, else go to 11.
8. Transaction is completed.
   8.1. Charge is deducted from mobile phone account.
   8.2. Toll is paid to Toll Operator.
   8.3. Charges are paid to the system & other participating parties.
   8.4. Electronic confirmation/receipt is sent to mobile phone.
9. Transaction is recorded in a database.
   9.1. Car Registration.
   9.2. Date, Time.
   9.3. Mobile Phone Number.
   9.4. Toll used.
   9.5. Charges made.
   9.6. Receipt number issued.
   9.7. Toll Class.
10. End of this transaction/process.
11. Start 'Insufficient Funds Process'.
12. Check has 'Insufficient Funds' or 'Reminder' been sent to this mobile as last message. If yes, do nothing—go to 15.
13. Mobile phone is sent an SMS stating that there are insufficient funds available on the account.
14. This action is recorded on the database.
    14.1. Car Registration.
    14.2. Date, Time.
    14.3. Mobile Phone Number.
    14.4. Toll Class.
    14.5. Action Type (Insufficient Funds).
15. End of this Process.
16. Reminder Process.
17. The system receives list from Toll Operator of all car registrations, and 'Toll Transit' details which will be classed as 'Default Payers' in the next payment run.
18. The system selects only eligible Classes of vehicle for processing.
19. Begin Cycle.
    19.1. When all records processed go to 25.
20. For each eligible Class record the system compares vehicle registration to its database.
21. For vehicle registrations found in the database, the system checks was a 'Reminder' or 'Insufficient Funds' SMS sent to this mobile as last message. If yes, do nothing—go to 24.
22. Send a 'Reminder' SMS to the Mobile Phone registered against that number.
23. This action is recorded on the database.
    23.1. Car Registration.
    23.2. Date, Time.
    23.3. Mobile Phone Number.
    23.4. Toll.
    23.5. Action Type (Reminder).
24. Next Cycle.
25. End of this Process.

In addition to the normal use, the "reminder" and "insufficient funds "communication with the system user enables the system user, by sending its required details by SMS/WAP the communication device is recognized electronically and a request is triggered automatically to call a predetermined number on the SMS (TEXT) telephone system. The cell mobile and/or fixed line telephones communicates with a base station which communicates over a land line with an electronic purse of the telecommunications provider to ascertain the availability of funds to make the transaction. Once the charge is confirmed the account is debited and system of the toll road operator is advised accordingly. An electronic funds transfer is initiated to transfer the toll charge required from the customer's purse to the purse of the system service provider. On satisfactory transfer of the funds an acknowledgement message is sent to device undertaking the transaction in the form of electronic receipt and this will be displayed as an SMS (TEXT) received on the communication device.

Any payments which are not cancelled after a predetermined time represent vehicles for which the toll charge payment has failed for one reason or another. For these the associated vehicle data records are processed to demand payment by letter and later by legal process. All of which add to costs to both parties. This group of defaulters is further processed prior to the default mechanism coming into operation. This involves efforts to allow the payment to be made using the system while keeping the "late payment" and "fines" to a minimum. The saving by payment prior to late payment charges and/or fines can only be beneficial to the operators and the toll debtors alike. The steps above are performed at greatly reduced expense using the solution. The remaining video/digital images are used to identify the appropriate video frames which can be automatically processed to extract vehicle registration numbers in order that their owners can be pursued for payment. Some vehicles may pass along the express lanes with defective or non-existent communication, tag, equipment or electronic purses. The video or/and digital images of these vehicles will be processed for pursuit of toll charge fees with appreciable surcharge and greatly increased expense thus reducing profitability.

There is required by the solution system the active participation of the consumer in the furnishing of data or details to be sent using electronic communication device, for example a fixed line or mobile telephone, the correct and accurate registration letters and numbers of the mechanically propelled vehicle in respect of which a toll charge is to be discharged. Failure in this regard voids the transaction but will incur a debit to the associated account of the refundable charge which must be reclaimed in writing or in default will stand to the credit of that electronic communication device for the purposes of discharging a toll charge in future use.

There is required by the solution system the active participation of the consumer in the furnishing of data or details to be sent using electronic communication device, for example a fixed line or mobile telephone, the correct and accurate toll road code letters and numbers being used by that mechanically propelled vehicle in respect of which a toll charge is to be discharged. Failure in this regard voids the transaction but will incur a debit to the associated account of the refundable charge which must be reclaimed in writing or in default will stand to the credit of that electronic communication device for the purposes of discharging a toll charge in future use.

There is required by the solution system the active participation of the consumer in the furnishing of data or details to be sent using electronic communication device, for example a fixed line or mobile telephone, the correct and accurate class of road vehicle code letters and numbers being associated with that used by that mechanically propelled vehicle in respect of which a toll charge is to be discharged such as leads to an improper charge imposed. Failure in this regard voids the transaction but will incur a debit to the associated account of the refundable charge which must be reclaimed in writing or in default will stand to the credit of that electronic communication device for the purposes of discharging a toll charge in future use.

There is required by the solution system the active participation of the consumer in the furnishing of data or details to be sent using electronic communication device, for example a fixed line or mobile telephone, the correct and accurate direction of travel being the letters and numbers of direction of travel on the toll road of that mechanically propelled vehicle in respect of which a toll charge is to be discharged. Failure in this regard voids the transaction but will incur a debit to the associated account of the refundable charge which must be reclaimed in writing or in default will stand to the credit of that electronic communication device for the purposes of discharging a toll charge in future use.

Failure to provide an electronic purse being an account with sufficient funds to discharge the fees associated with the transaction together with the toll charge and any late payment charges or/and fines voids the transaction but will incur a debit to the associated account of the refundable charge which must be reclaimed in writing or in default will stand to the credit of that electronic communication device for the purposes of discharging a toll charge in future use.

The issuing of an electronic receipt by the solution system is confirmation that the details furnished have been accepted and a debit has been made to the associated account with the communication device in respect of the details only. In the event that incorrect details have been furnished and accepted the toll charge in respect of any other vehicle remains unpaid.

The responsibility for ensuring the accuracy of the details furnished remains at all stages with the consumer. The provision of false or misleading information cannot and will not give rise to any liability of whatsoever nature on the part of the solution system or the toll operator.

Figure 4:
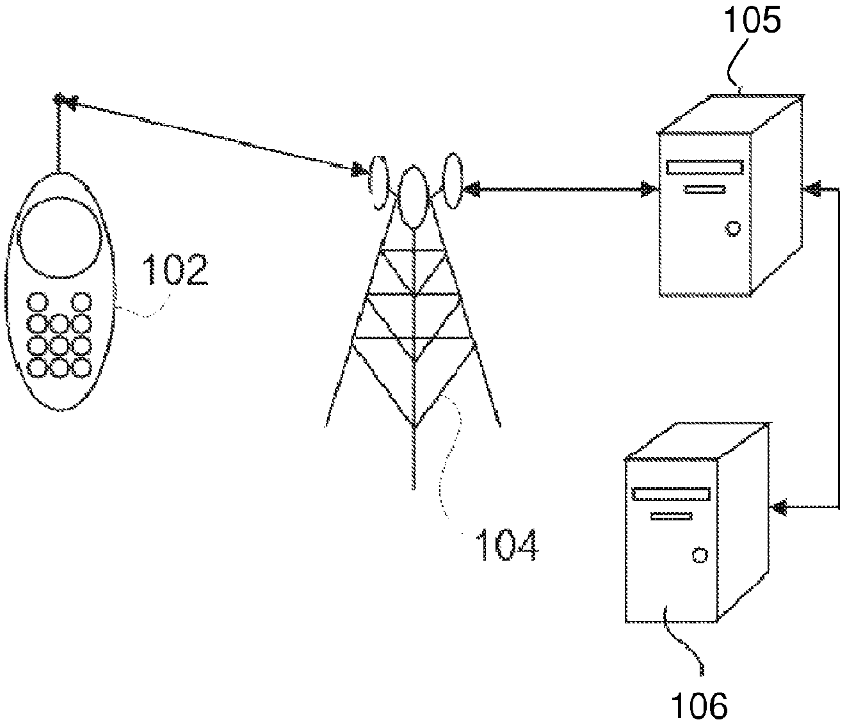
FIG. 4 illustrates a toll charge system incorporating a voice control message according to another embodiment of the invention.

FIG. 4 illustrates an alternative embodiment of the system according to the invention and similar to the embodiment described in FIG. 2. The electronic communication device, 102 is adapted to communicate with a remote communication system 105 via a base station 104. In operation, when a mobile phone user travels through a toll charge area in their vehicle the user rings from the electronic communication device 101 a number associated with the remote communication system 105, which can be controlled by the toll operator. The number can be a ‘free-phone’ number. The user leaves a voice or audio control message comprising a vehicle registration identifier and/or toll identifier information, by the user simply calling out the vehicle registration number and toll identifier. The remote communication system 105 identifies the mobile telephone number automatically from the call action (simple caller ID action) which is associated with the users pre-existing telecommunication account. The voice or audio control message is translated into a data message of the vehicle identifier information using a voice recognition system, for example an IVR system, on the remote communication system 105. The remote communication system 105 comprises means for automatically matching the received translated data message with captured vehicle identifier information (as described above) and, if a match is made, a toll charge payment is debited from the user’s pre-existing telecommunication account and credited to a toll operator account. This can be easily achieved by the remote communication system 105 by having an arrangement with the mobile phones user telecommunication account stored on a server 106 which is separate to the toll operator remote communication system 105. The server 106 can be controlled by a mobile phone operator. The mobile phone user account is debited with the requisite toll fee and credited to the toll operator without the need for the user to provide the toll operator with any personal financial details. It will be appreciated that before processing of the transaction takes place the voice recognition system can call back the vehicle identifier message to the user and request the user to confirm the vehicle identifier by saying YES or NO or by simply by pressing a requested alpha numeric key on the phone, for example the ‘*’ key/button. The voice recognition system can be supplied by a third party or directly by the toll operator or alternatively can be operated by a ‘manned’ or a fully automated service.

It will be appreciated that a congestion charge system, for example as operated in the city of London, can be implemented using the system described in FIGS. 2 and 4, according to one possible implementation of the invention.

It will be further appreciated that a vehicle parking system applicable to Transport systems within defined inner city and urban areas requires that the data to be furnished is altered to discharge payment charges can be implemented using the system described in FIGS. 2 and 4.

The solution system effectively extends the toll plaza over a huge area allowing tolls to be paid prior to, during and after the toll charge has been incurred.

The solution system effectively extends the toll plaza over a huge area allowing tolls to be paid without the need for barrier stopping.

The solution system effectively extends the toll plaza over a huge area allowing tolls to be paid without cash and cashiers reducing costs and security concerns associated with cash.

The solution system effectively extends the toll plaza over a huge area allowing tolls to be paid in a convenient manner time and place thus reducing the hardship cases associated with the current enforcement.

The solution system effectively extends the toll plaza over a huge area allowing tolls to be paid without the health and safety issues for toll operatives and motorists exposed to road traffic accidents.

The solution system effectively extends the toll plaza over a huge area allowing tolls to be paid while reducing wear and tear on vehicles in braking and accelerating away from barriers.

The solution system effectively extends the toll plaza over a huge area allowing tolls to be paid while recording in retrievable form the entire transaction for records, logs, diary and time management. The solution system effectively extends the toll plaza over a huge area allowing tolls to be paid while crossing frontiers and different currencies with convenience. The solution system effectively extends the toll plaza over a huge area allowing tolls to be paid by those wishing to pay enabling resources to be better utilized in dealing with those who will not pay.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the 'pre-existing telecommunication account', hereinbefore described, is to be interpreted as a mobile/cellular phone account in which a user pays a telephone/mobile/cellular operator for telecommunication services associated with the telephone number assigned to the mobile phone account and should be afforded a broad interpretation.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A toll charge payment system using electronic messaging from at least one mobile telephone communication device, said system comprising:

a remote communication system adapted to communicate with the at least one electronic communication device, wherein said at least one mobile telephone communication device is associated with a pre-existing telecommunication account with a telecommunication service provider belonging to a user;

recording means for capturing vehicle identifier information for vehicles passing through a toll charge area and storing said identifier information on said remote communication system or another remote communication system;

means for sending an electronic message from the mobile telephone communication device to the remote communication system wherein said electronic message comprises at least one of vehicle registration identifier information and toll identifier information; and said remote communication system comprises means for matching said received electronic message with said captured vehicle identifier information and, means for debiting a toll charge payment from the user's pre-existing telecommunication account and crediting a toll operator account in response to a match being made.

2. The system as claimed in claim 1 wherein if insufficient funds are available from said pre-existing telecommunication account, said remote communication system comprises means for sending an electronic message to said mobile telephone communication device advising the user of the inability to effect the toll charge payment.

3. The system as claimed in claim 1 wherein in the event that the vehicle registration details disclose that the associated toll charge remains un-discharged and the said vehicle had in a past transaction used the system to pay the toll charge, an electronic message is generated by said remote communication system and sent to the mobile telephone communication device associated with the past transaction advising that a toll charge remains unpaid and inviting to make payment using the system.

4. The system as claimed in claim 1 wherein the remote communication system comprises a data storage facility and micro-payment facility adapted to facilitate toll charge payment from said pre-existing telecommunication account.

5. The system as claimed in claim 1 wherein the electronic message comprises an SMS (TEXT) message containing data to effect the transaction being undertaken.

6. The system as claimed in claim 1, wherein the toll charge payment amount is dependent on a class of vehicle and said electronic message comprises information identifying the class of vehicle as determined by reference to a central vehicle registration data bank.

7. The system as claimed in claim 1, wherein the electronic message comprises a toll code in the form of XY, where X is the toll identifier and Y the direction of travel when toll charge was incurred.

8. The system as claimed in claim 1, wherein the at least one mobile telephone communication device uses an SMS/WAP system and includes personal SIM cards and a mobile and/or fixed line telephone identifier is the personal identifier in the SMS/WAP system.

9. The system as claimed in claim 1, comprising a mobile telephone system using a SMS/WAP system including personal SIM cards and a mobile and/or fixed line telephone identifier is the personal identifier in the SMS/WAP system wherein the SIM card accesses the pre-existing telecommunications account and enables the mobile telephone communication device to carry out transactions with the system.

10. The system as claimed in claim 1, wherein the electronic message can be sent by any mobile telephone communication device to effect a transaction for any vehicle and an electronic receipt issues to that device in the next future or immediately following transaction.

11. The system as claimed in claim 1 wherein the recording means comprises a camera associated with the toll location and captures images of the license plates of each vehicle that passes through the toll charge area and stores said license plate information with a time code stamp for comparison with any sent electronic messages.

12. The system as claimed in claim 11 wherein the recording means comprises a camera associated with the toll location and captures images of the license plates of each vehicle that passes through the toll charge area and stores said license plate information with a time code stamp for comparison with any sent electronic messages and wherein the comparison reveals the solution system users with accounts capable of being debited to a class appropriate to a central vehicle registration data bank relating to that particular vehicle are so debited and the electronic receipt is issued in time coded form to the telecommunications account.

13. The system as claimed in claim 1 wherein the recording means comprises a camera associated with the toll location and captures images of the license plates of each vehicle that passes through the toll charge area and stores said license plate information with a time code stamp for comparison with any sent electronic messages and wherein the comparison reveals the solution system users with accounts having been debited to a class appropriate to a central vehicle registration data bank relating to that particular vehicle were so debited and the toll charge operators account is credited.

14. The system as claimed in claim 1 wherein the recording means comprises a camera associated with the toll location and captures images of the license plates of each vehicle that passes through the toll charge area and stores said license plate information with a time code stamp for comparison with any sent electronic messages and wherein the comparison reveals the solution system users with accounts incapable of being debited to a class appropriate to a central vehicle registration data bank relating to that particular vehicle and the last transaction relating to that vehicle was using the solution system an SMS(text)/WAP is generated free gratis “Insufficient Funds”.

15. The system as claimed in claim 1 wherein the electronic message sent from the at least one mobile telephone communication device is a voice message comprising audio information of the vehicle registration identifier.

16. The system as claimed in claim 1 wherein the toll charge area comprises a congestion charge area.

17. The system as claimed in claim 1 wherein the toll charge area comprises a vehicle parking charge area.

18. The system as claimed in claim 1 wherein the remote communication system comprises a voice recognition system adapted for translating said voice control message into a data message representative of the vehicle registration identifier.

19. A method for toll charge payment using electronic messaging from at least one mobile telephone communication device, said method comprising:

adapting a remote communication system to communicate with the at least one mobile telephone communication device;

recording vehicle identifier information for vehicles passing through a toll charge area and storing said identifier information on said remote communication system or another remote communication system;

associating at least one mobile telephone communication device with a pre-existing telecommunication account of a telecommunication service provider belonging to a user;

sending an electronic message, from the mobile telephone communication device by said user to the remote communication system wherein said electronic message comprises at least one of vehicle registration identifier information and toll identifier information; and matching said received electronic message with said captured vehicle identifier information or said toll identifier information and, debiting a toll charge payment from the user’s pre-existing telecommunication account and crediting a toll operator account in response to a match being made.

20. A non-transitory computer readable medium comprising computer program instructions for causing a computer to perform the method as claimed in claim 19.

* * * * *